(12) United States Patent
Wang et al.

(10) Patent No.: US 11,916,997 B2
(45) Date of Patent: Feb. 27, 2024

(54) OFFLOADING METHOD, OF SATELLITE-TO-GROUND EDGE COMPUTING TASK, ASSISTED BY SATELLITE AND HIGH-ALTITUDE PLATFORM

(71) Applicant: SOUTHEAST UNIVERSITY, Jiangsu (CN)

(72) Inventors: Junbo Wang, Jiangsu (CN); Changfeng Ding, Jiangsu (CN); Hua Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 290 days.

(21) Appl. No.: 17/628,571

(22) PCT Filed: Apr. 25, 2021

(86) PCT No.: PCT/CN2021/089718
§ 371 (c)(1),
(2) Date: Jan. 20, 2022

(87) PCT Pub. No.: WO2022/160486
PCT Pub. Date: Aug. 4, 2022

(65) Prior Publication Data
US 2023/0156072 A1 May 18, 2023

(30) Foreign Application Priority Data
Jan. 27, 2021 (CN) .......................... 202110111245.1

(51) Int. Cl.
*H04L 67/10* (2022.01)
*H04B 7/0456* (2017.01)
*H04B 7/185* (2006.01)

(52) U.S. Cl.
CPC .......... *H04L 67/10* (2013.01); *H04B 7/0456* (2013.01); *H04B 7/18504* (2013.01); *H04B 7/18513* (2013.01)

(58) Field of Classification Search
CPC ... H04L 67/10; H04B 7/0456; H04B 7/18504; H04B 7/18513
See application file for complete search history.

(56) References Cited

FOREIGN PATENT DOCUMENTS

CN 111684738 9/2020

OTHER PUBLICATIONS

"International Search Report (Form PCT/ISA/210) of PCT/CN2021/089718," dated Oct. 28, 2021, pp. 1-4.
(Continued)

*Primary Examiner* — Curtis B Odom
(74) *Attorney, Agent, or Firm* — JCIPRNET

(57) ABSTRACT

An offloading method, of a satellite-to-ground edge computing task, assisted by a satellite and a high-altitude platform can offload a computing task of a ground user equipment (GUE) to a low earth-orbit satellite (LEO SAT), to meet a computing requirement of the GUE and to reduce latency and energy consumption. The method includes four main steps: 1. The GUE selects an associated high-altitude platform. 2. The GUE uses multi-input and multi-output (MIMO) transmission to offload the computing task to the high-altitude platform. 3. The high-altitude platform may also use the MIMO transmission to offload the computing task of the GUE to the LEO SAT. 4. The high-altitude platform and the LEO SAT cooperate to process the computing task of GUE, and reasonably allocate a computing resource to reduce energy consumption; and in MIMO edge computing, the GUE or the high-altitude platform uses the same time-domain and frequency-domain resource.

8 Claims, 2 Drawing Sheets

(56) References Cited

OTHER PUBLICATIONS

"Written Opinion of the International Searching Authority (Form PCT/ISA/237) of PCT/CN2021/089718," dated Oct. 28, 2021, pp. 1-5.

Long Zhang et al., "Satellite-Aerial Integrated Computing in Disasters: User Association and Offloading Decision," 2020 IEEE International Conference on Communications, Jul. 2020, pp. 1-7.

Yuanjun Wang et al., "A Computation Offloading Strategy in Satellite Terrestrial Networks with Double Edge Computing," IEEE International Conference on Communication Systems, Apr. 2019, pp. 1-7.

Changfeng Ding et al., "Joint Beamforming and Computation Offloading for Multi-User Mobile-Edge Computing," 2019 IEEE Global Communications Conference, Feb. 2020, pp. 1-6.

OFFLOADING METHOD, OF SATELLITE-TO-GROUND EDGE COMPUTING TASK, ASSISTED BY SATELLITE AND HIGH-ALTITUDE PLATFORM

CROSS-REFERENCE TO RELATED APPLICATION

This application is a 371 of international application of PCT application serial no. PCT/CN2021/089718, filed on Apr. 25, 2021, which claims the priority benefit of China application no. 202110111245.1, filed on Jan. 27, 2021. The entirety of each of the above mentioned patent applications is hereby incorporated by reference herein and made a part of this specification.

TECHNICAL FIELD

The present invention relates to a computing method, in particular to an offloading method, of a satellite-to-ground edge computing task, assisted by a satellite and a high-altitude platform.

BACKGROUND

Smart user equipment (UE) such as smartphones, tablets, and wearable devices is used as a powerful tool for text/voice/video communication, multimedia entertainment, electronic payment, and the like, and is becoming increasingly indispensable in our daily lives. Naturally, people expect smart user devices to be able to run more complex applications such as facial/speech recognition, interactive games, and augmented reality. However, these advanced applications consume a large amount of computing power and battery energy of smart UEs, which conflicts with the limited computing resources and battery energy of the smart UEs.

To alleviate the computational burden of the smart UEs, mobile edge computing (MEC) is considered to be a potential solution to support smart UEs running high-computational load and latency-sensitive applications.

Although computation offloading can be performed by effectively using the rich computing resources of edge servers, it additionally causes communication overhead such as transmission energy consumption and communication latency. Therefore, it is necessary to design properly based on the requirements on latency and accuracy of the smart UEs to balance the local computation and computation offloading.

In most of the existing computation offloading schemes, the single-antenna communication is used. Moreover, in the transmission multiplexing scheme, the frequency division multiple access (FDMA) and orthogonal frequency division multiple access (OFDMA), or time division multiple access (TDMA) are used. These computation offloading methods are simple to implement, but their system performance and spectrum efficiency are relatively limited. In addition, in most of the considered MEC systems, the edge servers are installed in fixed positions on the ground, for example, the cellular base stations.

At present, the existing task transmission manners of the MEC have the following essential differences:

1. The multi-antenna as well as multi-input and multi-output (MIMO) data transmission is not implemented, the transmission rate and spectrum efficiency are not improved.
2. The full frequency reuse is not implemented.
3. The edge computing method assisted by a satellite and a high-altitude platform is not considered, that is, the high-altitude platform is used as a relay to offload a computing task of a ground user to a low earth-orbit satellite (LEO SAT) for processing.

Therefore, the existing task transmission manners of the MEC has the problems of high transmission energy consumption and long communication latency.

SUMMARY

An objective of the present invention is to provide an offloading method, of a satellite-to-ground edge computing task, assisted by a satellite and a high-altitude platform, to reduce transmission energy consumption and communication latency.

To resolve the foregoing technical problem, the present invention provides the offloading method, of a satellite-to-ground edge computing task, assisted by a satellite and a high-altitude platform. The method is aimed at a computation offloading scenario (but not limited to this scenario) in the satellite-to-ground fusion MEC. Based on the computation offloading method assisted by a multi-antenna, MIMO high-altitude platform, the MIMO technology can be used to first offload a computing task of a ground user equipment (GUE) to the high-altitude platform, and then, with the assistance of the high-altitude platform, offload the computing task to a LEO SAT for processing. The method specifically includes the following steps:

step A: acquiring, by a LEO SAT, related information in a system;

step B: selecting, by the LEO SAT according to the acquired related information, a proper high-altitude platform for a ground user to associate with according to a method for associating a ground user with a high-altitude platform;

step C: offloading a computing task to the associated platform according to an association result between the ground user and the high-altitude platform by using a MIMO transmission method;

step D: dividing, by the high-altitude platform according to a result of a computing task allocation method after receiving the computing task of the ground user, the computing task of the ground user into two parts, that is, a task processed by the high-altitude platform and a task offloaded to the LEO SAT for processing; for the task processed by the high-altitude platform, allocating, by the high-altitude platform, a proper computing resource according to a computing resource allocation method to process the computing task of the ground user; and for the computing task offloaded to the LEO SAT, offloading, by the high-altitude platform, the computing task to the LEO SAT by using MIMO transmission method; and step E: allocating, by the LEO SAT after receiving the task offloaded by the high-altitude platform, a computing resource to each computing task according to the computing resource allocation method, to complete the computing tasks.

Further, the related information in the system that is acquired by the LEO SAT in step A includes: a computing task size, a task computing strength, a computing latency requirement that are of a GUE, wireless channel information from the ground user to the high-altitude platform, and channel information from the high-altitude platform to the LEO SAT, the computing power information of the high-altitude platform, and a requirement of the ground user for energy consumption.

The acquiring, by a LEO SAT, related information in a system in step A specifically includes the following steps:

step A1: selecting, by the ground user, a high-altitude platform of a best channel link gain for association according to a channel link gain from the ground user to the high-altitude platform, and transmitting related information of local equipment to the associated high-altitude platform; and step A2: forwarding, by the high-altitude platform, the related information to the LEO SAT.

Specifically, step B specifically includes the following steps:

step B1: establishing MIMO transmission models for associating the ground user with different high-altitude platforms, and a latency computing model and an energy consumption model when the computing task of the ground user is forwarded on the different high-altitude platforms and computing is performed; and step B2: loading an algorithm for associating the ground user with the high-altitude platform, determining an association relationship between the ground user and the high-altitude platform, and selecting a proper high-altitude platform for the ground user to associate with.

Further, step C specifically includes the following steps:

step C1: loading a MIMO pre-coding design algorithm from the ground user to the high-altitude platform to obtain a MIMO pre-coding matrix between the ground user and the associated high-altitude platform; and step C2: offloading the computing task of the ground user to the high-altitude platform by using the MIMO pre-coding design algorithm from the ground user to the high-altitude platform.

Further, the offloading, by the high-altitude platform, the computing task to the LEO SAT specifically includes the following steps:

step D1: establishing, by the high-altitude platform, a MIMO transmission model from the high-altitude platform to the LEO SAT according to computing task information of the ground user associated therewith, and providing the latency model and the energy consumption model when the high-altitude platform offloads the computing task to the LEO SAT;

step D2: loading a MIMO pre-coding design algorithm from the high-altitude platform to the LEO SAT to obtain a MIMO pre-coding matrix between the high-altitude platform and the LEO SAT; and step D3: offloading the computing task of the high-altitude platform to the LEO SAT by using the MIMO pre-coding design algorithm from the high-altitude platform to the LEO SAT.

Further, the ground user offloads the computing task in the following manners:

step 1: offloading, by a ground user equipment (UE) equipped with multiple antennas, the computing task to the associated high-altitude platform by using a MIMO technology, and receiving, by the high-altitude platform, data by using the multiple antennas;

step 2: offloading, by the high-altitude platform equipped with multiple antennas, the computing task to the LEO SAT by using the MIMO technology, and receiving, by the LEO SAT, data by also using the multiple antennas; and step 3: forwarding, by the high-altitude platform as a relay, the computing task offloaded by the ground user, and processing the computing task.

Further, the offloading method, of a satellite-to-ground edge computing task, assisted by a satellite and a high-altitude platform is suitable for a satellite network, a Wi-Fi network with a relay, a wireless heterogeneous network, a wireless sensor network, and a cellular communication network. The offloading method, of a satellite-to-ground edge computing task, assisted by a satellite and a high-altitude platform in the present invention has the following advantages:

By using the satellite-to-ground joint edge computing technology and the large-scale antenna MIMO technology, a satellite-to-ground joint edge computing method is designed in combination with user association, MIMO precoding, computing task allocation, and computing resource allocation. When the user association, MIMO precoding, computing task allocation, and computing resource allocation are designed, the system continuously optimizes the design according to energy consumption requirements to reduce transmission energy consumption and communication latency.

DETAILED DESCRIPTION OF THE EMBODIMENTS

With reference to the accompanying drawings, the offloading method, of a satellite-to-ground edge computing task, assisted by a satellite and a high-altitude platform in the present invention is further described below in detail.

Figure 1:
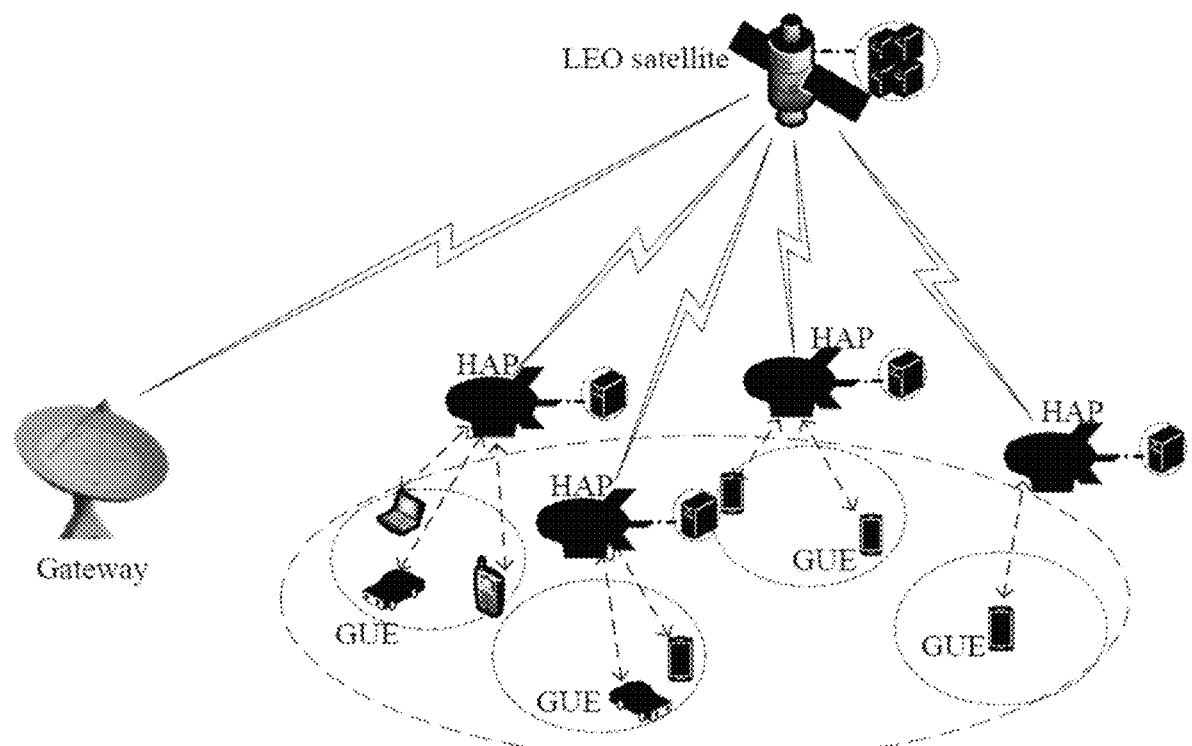
FIG. 1 is a scenario diagram of an example according to the present invention.

FIG. 1 is a scenario diagram of an example according to the present invention. As shown in FIG. 1, there are I ground users in a LEO SAT coverage region and K high-altitude platforms in the sky. The high-altitude platforms and the LEO SAT are all equipped with MEC servers. Each of the ground users needs to process a computing task in time. To meet the computing requirements of the ground users, the ground users first offload the computing tasks to the high-altitude platforms, and then the high-altitude platforms offload the computing tasks to the LEO SAT.

Figure 2:
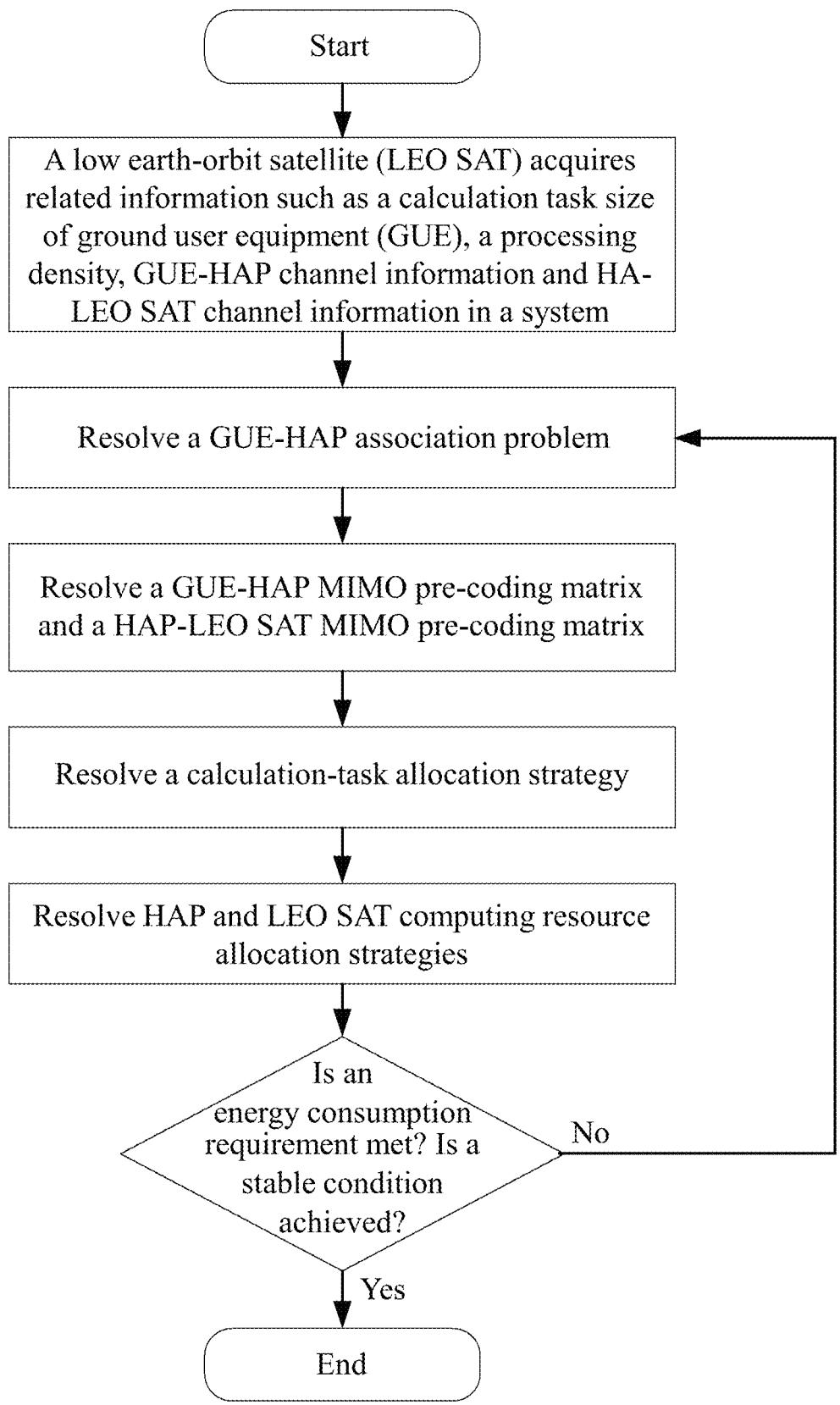
FIG. 2 is a schematic diagram of an implementation process according to the present invention.

FIG. 2 is a schematic diagram of an implementation process according to the present invention. The specific implementation steps are as follows:

Step 1: Related information in a system that is acquired by the LEO SAT includes: a computing task size, a task computing strength, a computing latency requirement that are of a GUE, wireless channel information from the ground user to the high-altitude platform, and channel information from the high-altitude platform to the LEO SAT, the computing power information of the high-altitude platform, and a requirement of the ground user for energy consumption.

The LEO SAT acquires the related information in the system by using the following steps:

(1) The ground user selects a high-altitude platform of a best channel link gain for association according to a channel link gain from the ground user to the high-altitude platform, and transmits related information of local equipment to the associated high-altitude platform; and (2) The high-altitude platform forwards the related information to the LEO SAT.

Step 2: The LEO SAT selects, according to the acquired related information, a proper high-altitude platform for a ground user to associate with according to a method for associating a ground user with a high-altitude platform, which specifically includes the following steps:
  (1) Establish MIMO transmission models for associating the ground user with different high-altitude platforms, and a latency computing model and an energy consumption model when the computing task of the ground user is forwarded on the different high-altitude platforms and computing is performed; and
  (2) Load an algorithm for associating the ground user with the high-altitude platform, determine an association relationship between the ground user and the high-altitude platform, and select a proper high-altitude platform for the ground user to associate with.

Step 3: Offload a computing task to the associated platform according to an association result between the ground user and the high-altitude platform by using a MIMO transmission method, which specifically includes the following steps:
  (1) Load a MIMO pre-coding design algorithm from the ground user to the high-altitude platform to obtain a MIMO pre-coding matrix between the ground user and the associated high-altitude platform; and
  (2) Offload the computing task of the ground user to the high-altitude platform by using the MIMO pre-coding design algorithm from the ground user to the high-altitude platform.

Step 4: After receiving the computing task of the ground user, the high-altitude platform divides, according to a result of a computing task allocation method, the computing task of the ground user into two parts, that is, a task processed by the high-altitude platform and a task offloaded to the LEO SAT for processing; for the task processed by the high-altitude platform, the high-altitude platform allocates a proper computing resource according to a computing resource allocation method to process the computing task of the ground user; and for the computing task offloaded to the LEO SAT, the high-altitude platform offloads the computing task to the LEO SAT by using MIMO transmission method; and Further, the step in which the high-altitude platform offloads the computing task to the LEO SAT specifically includes the following steps:
  (1) The high-altitude platform establishes a MIMO transmission model from the high-altitude platform to the LEO SAT according to computing task information of the ground user associated therewith, and provides the latency model and the energy consumption model when the high-altitude platform offloads the computing task to the LEO SAT;
  (2) Load a MIMO pre-coding design algorithm from the high-altitude platform to the LEO SAT to obtain a MIMO pre-coding matrix between the high-altitude platform and the LEO SAT;
  (3) Offload the computing task of the high-altitude platform to the LEO SAT by using the MIMO pre-coding design algorithm from the high-altitude platform to the LEO SAT; and
  (4) The LEO SAT, after receiving the task offloaded by the high-altitude platform, allocates a computing resource to each computing task according to the computing resource allocation method, to complete the computing tasks.

Step 5: The LEO SAT, after receiving the task offloaded by the high-altitude platform, allocates a computing resource to each computing task according to the computing resource allocation method, to complete the computing tasks.

In the present invention, the ground user offloads the computing task in the following manners:
  (1) A GUE equipped with multiple antennas offloads the computing task to the associated high-altitude platform by using a MIMO technology, and the high-altitude platform receives data by using the multiple antennas;
  (2) The high-altitude platform equipped with multiple antennas offloads the computing task to the LEO SAT by using the MIMO technology, and the LEO SAT receives data by also using the multiple antennas; and
  (3) The high-altitude platform as a relay can either forward the computing task offloaded by the ground user, or process the computing task.

The offloading method, of a satellite-to-ground edge computing task, assisted by a satellite and a high-altitude platform in the present invention is suitable for a satellite network, a Wi-Fi network with a relay, a wireless heterogeneous network, a wireless sensor network, and a cellular communication network.

It can be understood that the present invention is described through some embodiments. Those skilled in the art know that various changes or equivalent substitutions may be made to these features and embodiments without departing from the spirit and scope of the present invention. In addition, based on the teaching of the present invention, these features and embodiments may be modified to adapt to specific conditions and materials without departing from the spirit and scope of the present invention. Therefore, the present invention is not limited by the specific embodiments disclosed herein. All embodiments falling within the scope of the claims of the present application fall within the protection scope of the present invention.

What is claimed is:

1. An offloading method, of a satellite-to-ground edge computing task, assisted by a satellite and a high-altitude platform, wherein comprising the following steps:
  step A: acquiring, by a low earth-orbit satellite (LEO SAT), a related information in a system;
  step B: selecting, by the LEO SAT according to an acquired related information, a proper high-altitude platform for a ground user to associate with according to a method for associating the ground user with the high-altitude platform;
  step C: offloading a computing task to an associated platform according to an association result between the ground user and the high-altitude platform by using a multi-input and multi-output (MIMO) transmission method;
  step D: dividing, by the high-altitude platform according to a result of a computing task allocation method after receiving the computing task of the ground user, the computing task of the ground user into two parts, that is, a task processed by the high-altitude platform and a task offloaded to the LEO SAT for processing; for the task processed by the high-altitude platform, allocating, by the high-altitude platform, a proper computing resource according to a computing resource allocation method to process the computing task of the ground user; and for the computing task offloaded to the LEO SAT, offloading, by the high-altitude platform, the computing task to the LEO SAT by using the MIMO transmission method; and step E: allocating, by the LEO SAT after receiving a task offloaded by the high-altitude platform, a computing resource to each of the computing task according to the computing resource allocation method, to complete the computing task.

2. The offloading method, of the satellite-to-ground edge computing task, assisted by the satellite and the high-altitude platform according to claim 1, wherein the related information in the system that is acquired by the LEO SAT in the step A comprises: a computing task size, a task computing strength, a computing latency requirement that are of a ground user equipment (GUE), a wireless channel information from the ground user to the high-altitude platform, and a channel information from the high-altitude platform to the LEO SAT, a computing power information of the high-altitude platform, and a requirement of the ground user for an energy consumption.

3. The offloading method, of the satellite-to-ground edge computing task, assisted by the satellite and the high-altitude platform according to claim 2, wherein the acquiring, by the LEO SAT, the related information in the system in the step A specifically comprises the following steps:

step A1: selecting, by the ground user, the high-altitude platform of a best channel link gain for association according to a channel link gain from the ground user to the high-altitude platform, and transmitting the related information of local equipment to an associated high-altitude platform; and step A2: forwarding, by the high-altitude platform, the related information to the LEO SAT.

4. The offloading method, of the satellite-to-ground edge computing task, assisted by the satellite and the high-altitude platform according to claim 1, wherein the step B specifically comprises the following steps:

step B1: establishing MIMO transmission models for associating the ground user with different high-altitude platforms, and a latency computing model and an energy consumption model when the computing task of the ground user is forwarded on the different high-altitude platforms and computing is performed; and step B2: loading an algorithm for associating the ground user with the high-altitude platform, determining an association relationship between the ground user and the high-altitude platform, and selecting the proper high-altitude platform for the ground user to associate with.

5. The offloading method, of the satellite-to-ground edge computing task, assisted by the satellite and the high-altitude platform according to claim 4, wherein the step C specifically comprises the following steps:

step C1: loading a MIMO pre-coding design algorithm from the ground user to the high-altitude platform to obtain a MIMO pre-coding matrix between the ground user and an associated high-altitude platform; and step C2: offloading the computing task of the ground user to the high-altitude platform by using the MIMO pre-coding design algorithm from the ground user to the high-altitude platform.

6. The offloading method, of the satellite-to-ground edge computing task, assisted by the satellite and the high-altitude platform according to claim 4, wherein the offloading, by the high-altitude platform, the computing task to the LEO SAT specifically comprises the following steps:

step D1: establishing, by the high-altitude platform, the MIMO transmission models from the high-altitude platform to the LEO SAT according to a computing task information of the ground user associated therewith, and providing a latency model and the energy consumption model when the high-altitude platform offloads the computing task to the LEO SAT;

step D2: loading a MIMO pre-coding design algorithm from the high-altitude platform to the LEO SAT to obtain a MIMO pre-coding matrix between the high-altitude platform and the LEO SAT; and step D3: offloading the computing task of the high-altitude platform to the LEO SAT by using the MIMO pre-coding design algorithm from the high-altitude platform to the LEO SAT.

7. The offloading method, of the satellite-to-ground edge computing task, assisted by the satellite and the high-altitude platform according to claim 1, wherein the ground user offloads the computing task in the following manners:

step 1: offloading, by a ground user equipment (GUE) equipped with multiple antennas, the computing task to an associated high-altitude platform by using a MIMO technology, and receiving, by the high-altitude platform, a data by using the multiple antennas;

step 2: offloading, by the high-altitude platform equipped with the multiple antennas, the computing task to the LEO SAT by using the MIMO technology, and receiving, by the LEO SAT, the data by also using the multiple antennas; and step 3: forwarding, by the high-altitude platform as a relay, the computing task offloaded by the ground user, and processing the computing task.

8. The offloading method, of the satellite-to-ground edge computing task, assisted by the satellite and the high-altitude platform according to claim 1, being suitable for a satellite network, a Wi-Fi network with a relay, a wireless heterogeneous network, a wireless sensor network, and a cellular communication network.

* * * * *